United States Patent
Hutton et al.

(10) Patent No.: US 6,687,738 B1
(45) Date of Patent: *Feb. 3, 2004

(54) ESTABLISHING AN INTERNET TELEPHONE CALL USING E-MAIL

(75) Inventors: Glenn W. Hutton, Miami, FL (US); Shane D. Mattaway, Boca Raton, FL (US); Craig B. Strickland, Tamarac, FL (US)

(73) Assignee: NetSpeak Corporation, Newark, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/343,278

(22) Filed: Jun. 30, 1999

Related U.S. Application Data (62) Division of application No. 08/533,115, filed on Sep. 25, 1995, now Pat. No. 6,108,704.

(51) Int. Cl.[7] .............................................. G06F 15/17
(52) U.S. Cl. ...................................................... 709/204
(58) Field of Search ................................ 709/204, 205, 709/217, 218, 227, 228, 235; 370/352, 355, 357, 389, 395

(56) References Cited

U.S. PATENT DOCUMENTS

| | | | | | |
|---|---|---|---|---|---|
| 5,159,592 | A | * | 10/1992 | Perkins | 370/338 |
| 5,396,485 | A | * | 3/1995 | Ohno et al. | 370/217 |
| 5,434,797 | A | * | 7/1995 | Barris | 709/204 |

(List continued on next page.)

OTHER PUBLICATIONS

VocalTech Internet Prone TM, Feb. 1995, VocalTe ch Ltd.,5 pages.*
December et al., The World Wide Web Unleashed, 1994, 23 pages.*
Netscape Conference and Cooltalk Meeting Room, www.q5.com. 1996, 6 pages.*
Gull, Re: Getting IP Address of PPP–connected Mac, <jgull–304951005350001@pm012–II.dialip.mich.net>, Apr. 1995, 2 pages.*
Gull, Re: Internet Phone for Mac?, <jgull–1704950116450001 @pm049–28.dialip.mich.net>, Apr. 1995, 2 pages.*
Ahrens, "Frequently–Asked Questions about Internet VoiceChat 1.1 FAQ Version: 1:0", copyrioght 1994, Google Newsgroups, Feb. 1995, pp. 5.*

*Primary Examiner*—Bunjob Jaroenchonwanit
(74) *Attorney, Agent, or Firm*—Kenyon & Kenyon (57) ABSTRACT

A point-to-point Internet protocol exchanges Internet Protocol (IP) addresses between processing units to establish a point-to-point communication link between the processing units through the Internet. A first point-to-point Internet protocol includes the steps of (a) storing in a database a respective IP address of a set of processing units that have an on-line status with respect to the Internet; (b) transmitting a query from a first processing unit to a connection server to determine the on-line status of a second processing unit; and (c) retrieving the IP address of the second unit from the database using the connection server, in response to the determination of a positive on-line status of the second processing unit, for establishing a point-to-point communication link between the first and second processing units through the Internet. A second point-to-point Internet protocol includes the steps of (a) transmitting an E-mail signal, including a first IP address, from a first processing unit; (b) processing the E-mail signal through the Internet to deliver the E-mail signal to a second processing unit; and (c) transmitting a second IP address to the first processing unit for establishing a point-to-point communication link between the first and second processing units through the Internet.

9 Claims, 6 Drawing Sheets

U.S. PATENT DOCUMENTS

| | | | | |
|---|---|---|---|---|
| 5,487,100 A | * | 1/1996 | Kane | 340/7.23 |
| 5,524,254 A | * | 6/1996 | Morgan et al. | 370/402 |
| 5,563,882 A | * | 10/1996 | Bruno et al. | 348/14.09 |
| 5,574,774 A | * | 11/1996 | Ahlberg et al. | 455/422 |
| 5,581,552 A | * | 12/1996 | Civanlar et al. | 370/396 |
| 5,608,786 A | * | 3/1997 | Gordon | 358/402 |
| 5,680,392 A | * | 10/1997 | Semaan | 348/14.09 |
| 5,740,231 A | * | 4/1998 | Cohn et al. | 370/401 |
| 5,751,712 A | * | 5/1998 | Farwell et al. | 370/431 |
| 5,796,394 A | * | 8/1998 | Wicks et al. | 345/751 |
| 5,805,810 A | * | 9/1998 | Maxwell | 709/227 |
| 5,828,846 A | * | 10/1998 | Kirby et al. | 370/351 |
| 5,841,769 A | * | 11/1998 | Okanoue et al. | 370/338 |
| 5,872,922 A | * | 2/1999 | Hogan et al. | 348/14.03 |
| 5,937,162 A | * | 8/1999 | Funk et al. | 370/338 |
| 5,946,629 A | * | 8/1999 | Sawyer et al. | 455/426 |
| 5,950,123 A | * | 9/1999 | Schwelb et al. | 340/7.57 |
| 5,950,172 A | * | 9/1999 | Klingman | 705/26 |
| 6,014,710 A | * | 1/2000 | Talluri et al. | 709/219 |
| 6,047,054 A | * | 4/2000 | Bayless et al. | 379/158 |
| 6,108,704 A | * | 8/2000 | Hutton et al. | 709/204 |
| 6,131,121 A | * | 10/2000 | Mattaway et al. | 709/206 |

* cited by examiner

ESTABLISHING AN INTERNET TELEPHONE CALL USING E-MAIL

RELATED APPLICATIONS

This application is a divisional application of U.S. patent application Ser. No. 08/533,115, filed Sep. 25, 1995, by Glen W. Hutton et al. and entitled POINT-TO-POINT INTERNET PROTOCOL, which issued as U.S. Pat. No. 6,108,704.

BACKGROUND OF THE INVENTION

1. Field of the Invention

This disclosure relates to network communication protocols, and in particular to a point-to-point protocol for use with the Internet.

2. Description of the Related Art

The increased popularity of on-line services such as AMERICA ONLINE™, COMPUSERVE®, and other services such as Internet gateways have spurred applications to provide multimedia, including video and voice clips, to online users. An example of an online voice clip application is VOICE E-MAIL FOR WINCIM and VOICE E-MAIL FOR AMERICA ONLINE™, available from Bonzi Software, as described in "Simple Utilities Send Voice E-Mail Online", MULTIMEDIA WORLD, VOL. 2, NO. 9, August 1995, p. 52. Using such Voice E-Mail software, a user may create an audio message to be sent to a predetermined E-mail address specified by the user.

Generally, devices interfacing to the Internet and other online services may communicate with each other upon establishing respective device addresses. One type of device address is the Internet Protocol (IP) address, which acts as a pointer to the device associated with the IP address. A typical device may have a Serial Line Internet Protocol or Point-to-Point Protocol (SLIP/PPP) account with a permanent IP address for receiving e-mail, voicemail, and the like over the Internet. E-mail and voicemail is generally intended to convey text, audio, etc., with any routing information such as an IP address and routing headers generally being considered an artifact of the communication, or even gibberish to the recipient.

Devices such as a host computer or server of a company may include multiple modems for connection of users to the Internet, with a temporary IP address allocated to each user. For example, the host computer may have a general IP address XXX.XXX.XXX, and each user may be allocated a successive IP address of XXX.XXX.XXX.10, XXX.XXX.XXX.11, XXX.XXX.XXX.12, etc. Such temporary IP addresses may be reassigned or recycled to the users, for example, as each user is successively connected to an outside party. For example, a host computer of a company may support a maximum of 254 IP addresses which are pooled and shared between devices connected to the host computer.

Permanent IP addresses of users and devices accessing the Internet readily support point-to-point communications of voice and video signals over the Internet. For example, realtime video teleconferencing has been implemented using dedicated IP addresses and mechanisms known as reflectors. Due to the dynamic nature of temporary IP addresses of some devices accessing the Internet, point-to-point communications in realtime of voice and video have been generally difficult to attain.

SUMMARY OF THE INVENTION

A point-to-point Internet protocol is disclosed which exchanges Internet Protocol (IP) addresses between processing units to establish a point-to-point communication link between the processing units through the Internet.

A first point-to-point Internet protocol is disclosed which includes the steps of:

(a) storing in a database a respective IP address of a set of processing units that have an on-line status with respect to the Internet;

(b) transmitting a query from a first processing unit to a connection server to determine the on-line status of a second processing unit; and (c) retrieving the IP address of the second unit from the database using the connection server, in response to the determination of a positive on-line status of the second processing unit, for establishing a point-to-point communication link between the first and second processing units through the Internet.

A second point-to-point Internet protocol is disclosed, which includes the steps of:

(a) transmitting an E-mail signal, including a first IP address, from a first processing unit;

(b) processing the E-mail signal through the Internet to deliver the E-mail signal to a second processing unit; and (c) transmitting a second IP address to the first processing unit for establishing a point-to-point communication link between the first and second processing units through the Internet.

BRIEF DESCRIPTION OF THE DRAWINGS

The features of the disclosed point-to-point Internet protocol and system will become more readily apparent and may be better understood by referring to the following detailed description of an illustrative embodiment of the present invention, taken in conjunction with the accompanying drawings, where.

DESCRIPTION OF THE PREFERRED EMBODIMENTS

Figure 1:
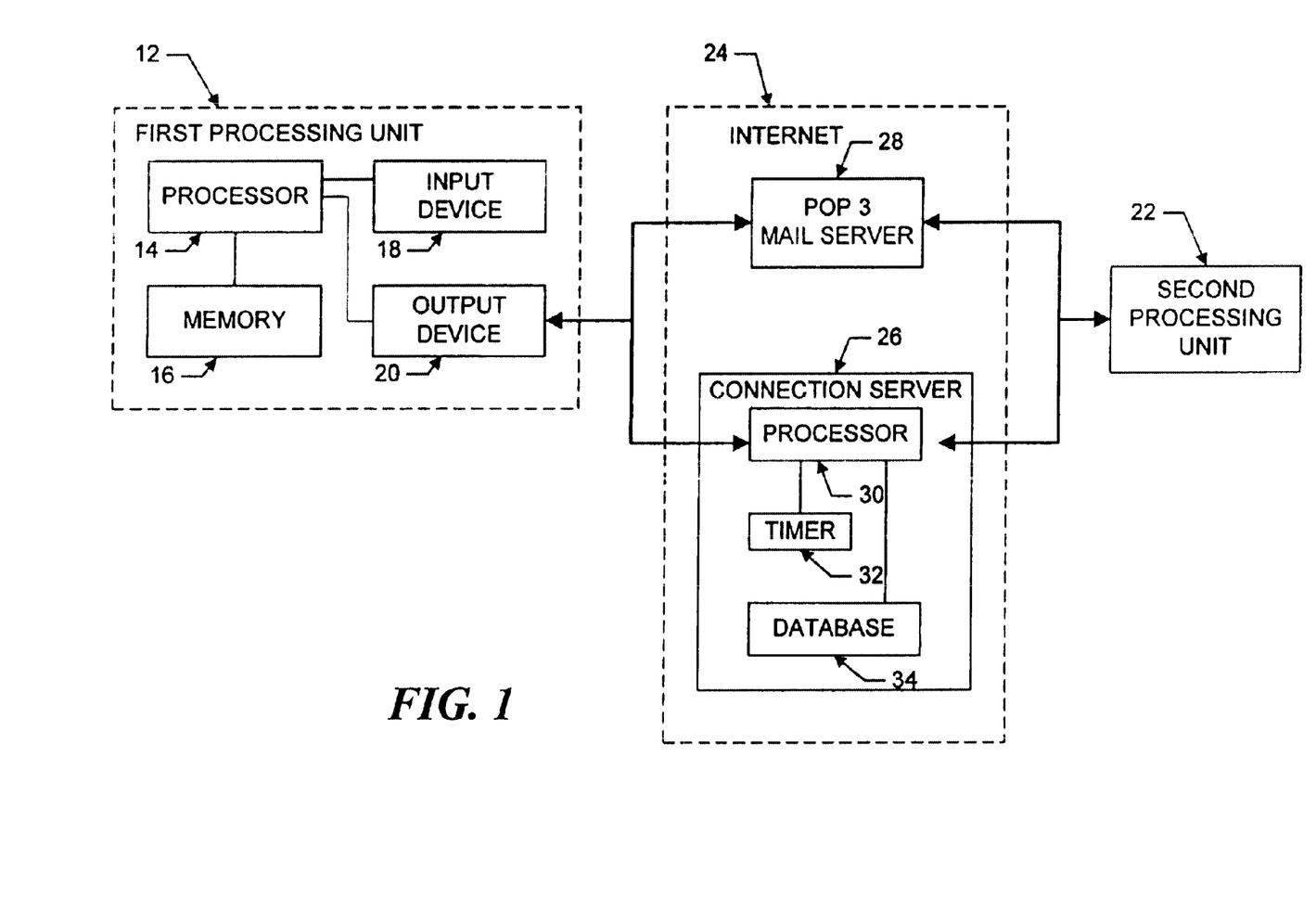
FIG. 1 illustrates, in block diagram format, a system for the disclosed point-to-point Internet protocol.

Referring now in specific detail to the drawings, with like reference numerals identifying similar or identical elements, as shown in FIG. 1, the present disclosure describes a point-to-point Internet protocol and system 10 for using such a protocol.

In an exemplary embodiment, the system 10 includes a first processing unit 12 for sending at least a voice signal from a first user to a second user. The first processing unit 12 includes a processor 14, a memory 16, an input device 18, and an output device 20. The output device 20 includes at least one modem capable of, for example, 14.4 kbaud communications and operatively connected via wired and/or wireless communication connections to the Internet. One skilled in the art would understand that the input device 18 may be implemented at least in part by the modem of the output device 20 to allow input signals from the communication connections to be received. The second processing unit 22 may have a processor, memory, and input and output devices, including at least one modem and associated communication connections, as described above for the first processing unit 12. In an exemplary embodiment, each of the processing units 12, 22 may be a WEBPHONE™ unit, available from NETS Peak Corporation, Boca Raton, Fla., capable of operating the disclosed point-to-point Internet protocol and system 10, as described herein.

The first processing unit 12 and the second processing unit 22 are operatively connected to the Internet 24 by communication devices and software known in the art. The processing units 12, 22 may be operatively interconnected through the Internet 24 to a connection server 26, and may also be operatively connected to a mail server 28 associated with the Internet 24.

The connection server 26 includes a processor 30, a timer 32 for generating timestamps, and a memory such as a database 34 for storing, for example, E-mail and Internet Protocol (IP) addresses of logged-in units. In an exemplary embodiment, the connection server 26 may be a SPARC 5 server or a SPARC 20 server, available from SUN MICROSYSTEMS, INC., Mountain View, Calif., having a central processing unit (CPU) as processor 30 operating an operating system (OS) such as UNIX and providing timing operations such as maintaining the timer 32, a hard drive or fixed drive as well as dynamic random access memory (DRAM) for storing the database 34, and a keyboard and display and/or other input and output devices (not shown in FIG. 1). The database 34.may be an SQL database available from ORACLE or INFOMIX.

In an exemplary embodiment, the mail server 28 may be a Post Office Protocol (POP) Version 3 mail server including a processor, memory, and stored programs operating in a UNIX environment, or alternatively another OS, to process E-mail capabilities between processing units and devices over the Internet 24.

The first processing unit 12 may operate the disclosed point-to-point Internet protocol by a computer program described hereinbelow in conjunction with FIG. 6, which may be implemented from compiled and/or interpreted source code in the C++ programming language and which may be downloaded to the first processing unit 12 from an external computer. The operating computer program may be stored in the memory 16, which may include about 8 MB RAM and/or a hard or fixed drive having about 8 MB. Alternatively, the source code may be implemented in the first processing unit 12 as firmware, as an erasable read only memory (EPROM), etc. It is understood that one skilled in the art would be able to use programming languages other than C++ to implement the disclosed point-to-point Internet protocol and system 10.

The processor 14 receives input commands and data from a first user associated with the first processing unit 12 through the input device 18, which may be an input port connected by a wired, optical, or a wireless connection for electromagnetic transmissions, or alternatively may be transferable storage media, such as floppy disks, magnetic tapes, compact disks, or other storage media including the input data from the first user.

The input device 18 may include a user interface (not shown) having, for example, at least one button actuated by the user to input commands to select from a plurality of operating modes to operate the first processing unit 12. In alternative embodiments, the input device 18 may include a keyboard, a mouse, a touch screen, and/or a data reading device such as a disk drive for receiving the input data from input data files stored in storage media such as a floppy disk or, for example, an 8 mm storage tape. The input device 18 may alternatively include connections to other computer systems to receive the input commands and data therefrom.

The first processing unit 12 may include a visual interface as the output device 20 for use in conjunction with the input device 18 and embodied as one of the screens illustrated by the examples shown in FIGS. 5–6 and discussed below. It is also understood that alternative input devices may be used in conjunction with alternative output devices to receive commands and data from the user, such as keyboards, mouse devices, and graphical user interfaces (GUI) such as WINDOWS™ 3.1 available from MICROSOFT™ Corporation Redmond, Wash., executed by the processor 14 using, for example, DOS 5.0. One skilled in the art would understand that other operating systems and GUIs, such as OS/2 and OS/2 WARP, available from IBM CORPORATION, may be used. Other alternative input devices may include microphones and/or telephone handsets for receiving audio voice data and commands, with the first processing unit 12 including speech or voice recognition devices, dual tone multi-frequency (DTMF) based devices, and/or software known in the art to accept voice data and commands and to operate the first processing unit 12.

Figure 4:
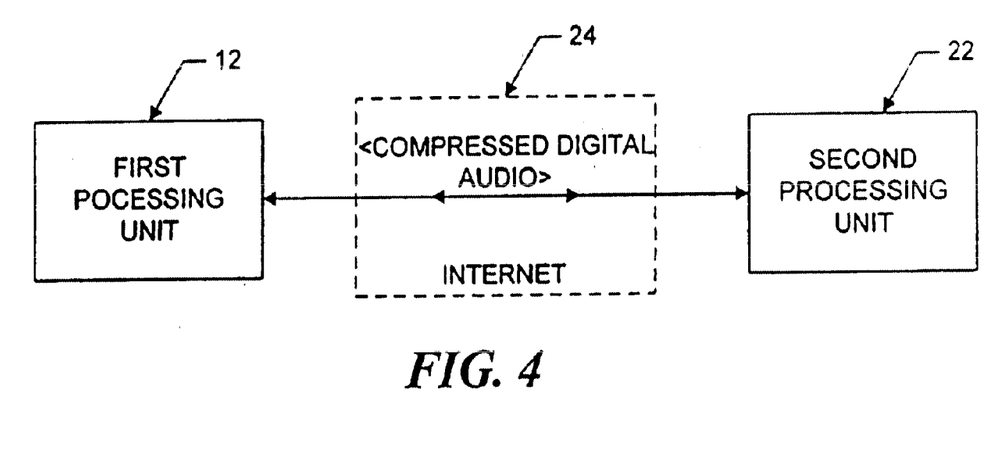
FIG. 4 is another block diagram of the system of FIGS. 1–2 with audio communications being conducted.
Figure 5:
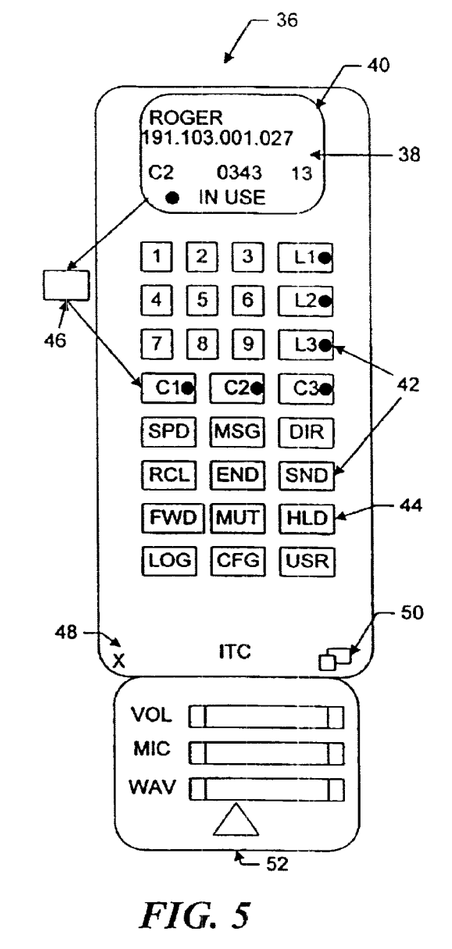
FIG. 5 illustrates a display screen for a processing unit.

In addition, either of the first processing unit 12 and the second processing unit 22 may be implemented in a personal digital assistant (PDA) providing modem and E-mail capabilities and Internet access, with the PDA providing the input/output screens for mouse interaction or for touch-screen activation as shown, for example, in FIGS. 4–5, as a combination of the input device 18 and output device 20.

For clarity of explanation, the illustrative embodiment of the disclosed point-to-point Internet protocol and system 10 is presented as having individual functional blocks, which may include functional blocks labelled as "processor" and "processing unit". The functions represented by these blocks may be provided through the use of either shared or dedicated hardware, including, but not limited to, hardware capable of executing software. For example, the functions of each of the processors and processing units presented herein may be provided by a shared processor or by a plurality of individual processors. Moreover, the use of the functional blocks with accompanying labels herein is not to be construed to refer exclusively to hardware capable of executing software. Illustrative embodiments may include digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided. Any and all of these embodiments may be deemed to fall within the meaning of the labels for the functional blocks as used herein.

The processing units 12, 22 are capable of placing calls and connecting to other processing units connected to the Internet 24, for example, via dialup SLIP/PPP lines. In an exemplary embodiment, each processing unit assigns an unsigned long session number, for example, a 32-bit long sequence in a *.ini file for each call. Each call may be assigned a successive session number in sequence, which may be used by the respective processing unit to associate the call with one of the SLIP/PPP lines, to associate a <ConnectOK> response signal with a <ConnectRequest> signal, and to allow for multiplexing and demultiplexing of inbound and outbound conversations on conference lines.

For callee (or called) processing units with fixed IP addresses, the caller (or calling) processing unit may open a "socket", i.e. a file handle or address indicating where data is to be sent, and transmit a <Call> command to establish communication with the callee utilizing, for example, datagram services such as Internet Standard network layering as well as transport layering, which may include a Transport Control Protocol (TCP) or a User Datagram Protocol (UDP) on top of the IP. Typically, a processing unit having a fixed IP address may maintain at least one open socket and a called processing unit waits for a <Call> command to assign the open socket to the incoming signal. If all lines are in use, the callee processing unit sends a BUSY signal or message to the caller processing unit.

As shown in FIG. 1, the disclosed point-to-point Internet protocol and system 10 operate when a callee processing unit does not have a fixed or predetermined IP address. In the exemplary embodiment and without loss of generality, the first processing unit 12 is the caller processing unit and the second processing unit 22 is the called processing unit.

When either of processing units 12, 22 logs on to the Internet via a dial-up connection, the respective unit is provided a dynamically allocated IP address by a connection service provider.

Upon the first user initiating the point-to-point Internet protocol when the first user is logged on to the Internet 24, the first processing unit 12 automatically transmits its associated E-mail address and its dynamically allocated IP address to the connection server 26. The connection server 26 then stores these addresses in the database 34 and timestamps the stored addresses using timer 32. The first user operating the first processing unit 12 is thus established in the database 34 as an active on-line party available for communication using the disclosed point-to-point Internet protocol. Similarly, a second user operating the second processing unit 22, upon connection to the Internet 24 through the connection server 26, is processed by a connection service provider to be established in the database 34 as an active on-line party.

The connection server 26 may use the timestamps to update the status of each processing unit; for example, after 2 hours, so that the on-line status information stored in the database 34 is relatively current. Other predetermined time periods, such as a default value of 24 hours, may be configured by a systems operator.

Figure 6:
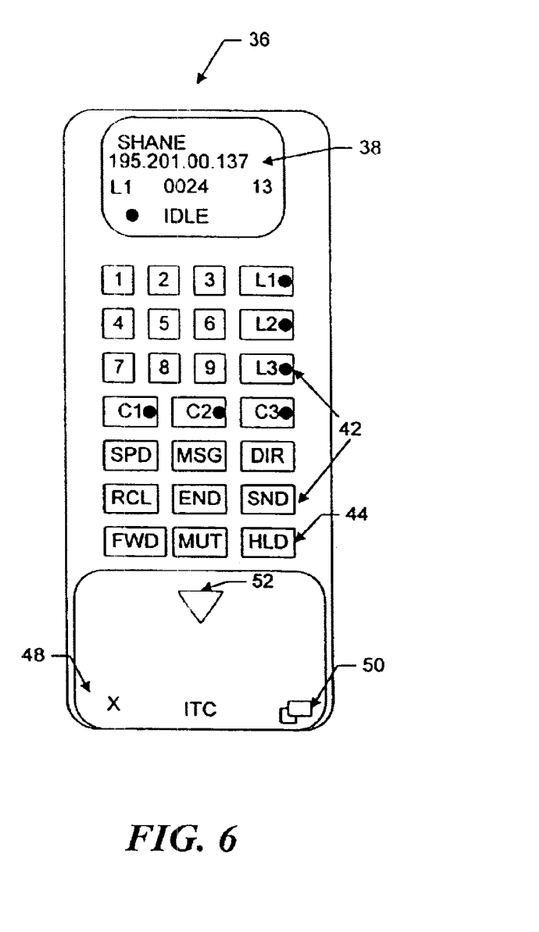
FIG. 6 illustrates another display screen for a processing unit.

The first user with the first processing unit 12 initiates a call using, for example, a Send command and/or a command to speeddial an $N^{TH}$ stored number, which may be labelled [SND] and [SPD][N], respectively, by the input device 18 and/or the output device 20, such as shown in FIGS. 5–6. In response to either the Send or speeddial commands, the first processing unit 12 retrieves from memory 16 a stored E-mail address of the callee corresponding to the $N^{TH}$ stored number. Alternatively, the first user may directly enter the E-mail address of the callee.

The first processing unit 12 then sends a query, including the E-mail address of the callee, to the connection server 26.

The connection server 26 then searches the database 34 to determine whether the callee is logged-in by finding any stored information corresponding to the callee's E-mail address indicating that the callee is active and on-line. If the callee is active and on-line, the connection server 26 then performs the primary point-to-point Internet protocol; i.e. the IP address of the callee is retrieved from the database 34 and sent to the first processing unit 12. The first processing unit 12 may then directly establish the point-to-point Internet communications with the callee using the IP address of the callee.

If the callee is not on-line when the connection server 26 determines the callee's status, the connection server 26 sends an OFF-LINE signal or message to the first processing unit 12. The first processing unit 12 may also display a message such as "Called Party Off-Line" to the first user.

When a user logs off or goes off-line from the Internet 24, the connection server 26 updates the status of the user in the database 34; for example, by removing the user's information, or by flagging the user as being off-line. The connection server 26 may be instructed to update the user's information in the database 34 by an off-line message, such as a data packet, sent automatically from the processing unit of the user prior to being disconnected from the connection server 26. Accordingly, an off-line user is effectively disabled from making and/or receiving point-to-point Internet communications.

Figure 2:
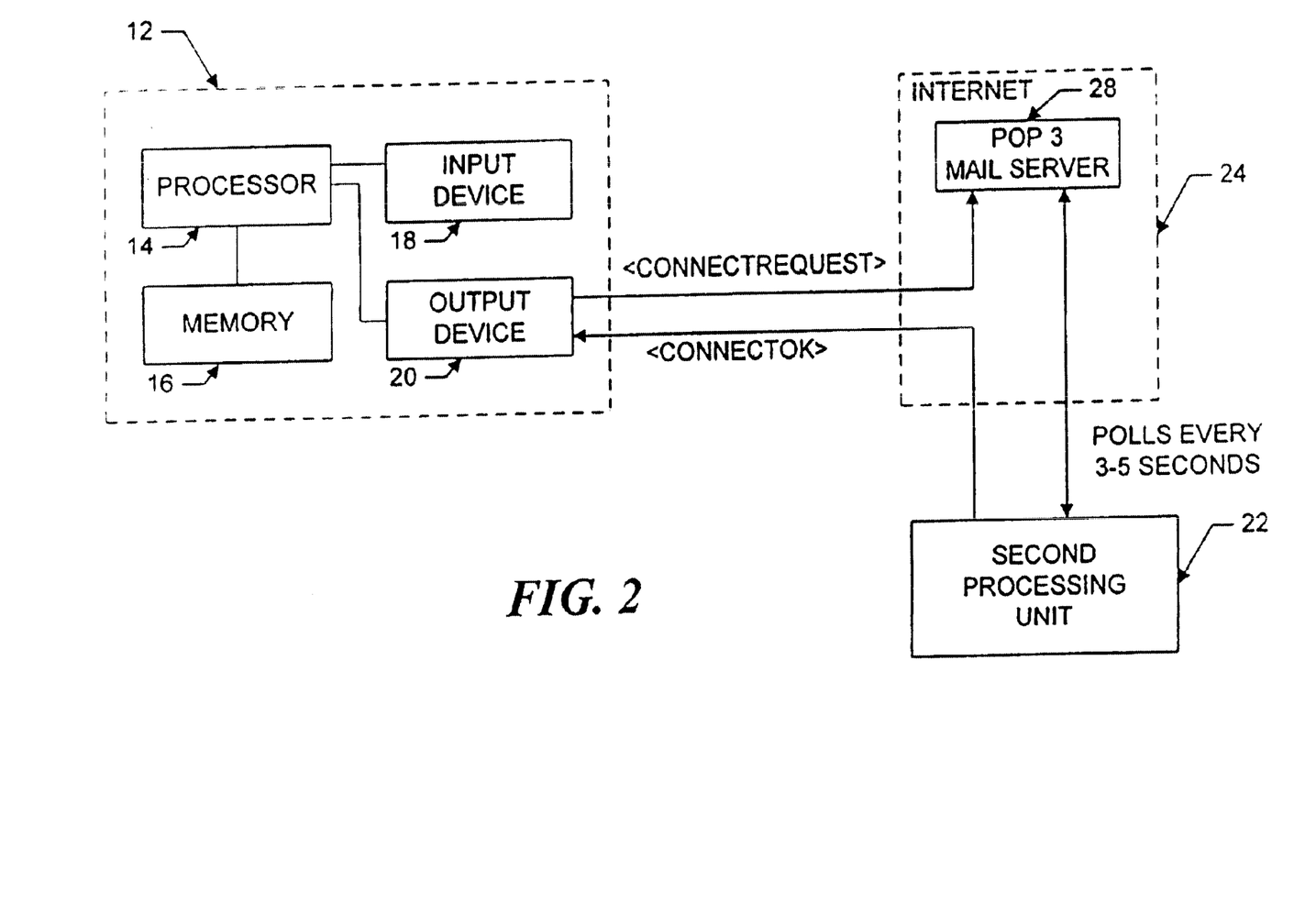
FIG. 2 illustrates, in block diagram format, the system using a secondary point-to-point Internet protocol.
Figure 3:
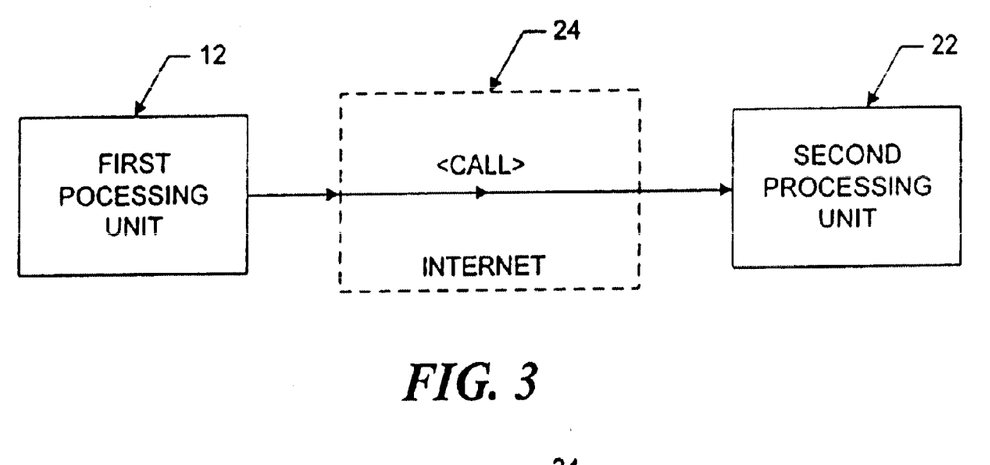
FIG. 3 illustrates, in block diagram format, the system of FIGS. 1–2 with the point-to-point Internet protocol established.

As shown in FIGS. 2–4, the disclosed secondary point-to-point Internet protocol may be used as an alternative to the primary point-to-point Internet protocol described above, for example, if the connection server 26 is nonresponsive, inoperative, and/or unable to perform the primary point-to-point Internet protocol, as a nonresponsive condition. Alternatively, the disclosed secondary point-to-point Internet protocol may be used independent of the primary point-to-point Internet protocol. In the disclosed secondary point-to-point Internet protocol, the first processing unit 12 sends a <ConnectRequest> message via E-mail over the Internet 24 to the mail server 28. The E-mail including the <ConnectRequest> message may have, for example, the subject

[*wp#XXXXXXXX#nnn.nnn.nnn.nnn#emailAddr]

where nnn.nnn.nnn.nnn is the current (i.e. temporary or permanent) IP address of the first user, and XXXXXXXX is a session number, which may be unique and associated with the request of the first user to initiate point-to-point communication with the second user.

As described above, the first processing unit 12 may send the <ConnectRequest> message in response to an unsuccessful attempt to perform the primary point-to-point Internet protocol. Alternatively, the first processing unit 12 may send the <ConnectRequest> message in response to the first user initiating a SEND command or the like.

After the <ConnectRequest> message via E-mail is sent, the first processing unit 12 opens a socket and waits to detect a response from the second processing unit 22. A timeout timer, such as timer 32, may be set by the first processing unit 12, in a manner known in the art, to wait for a predetermined duration to receive a <ConnectOK> signal. The processor 14 of the first processing unit 12 may cause the output device 20 to output a Ring signal to the user, such as an audible ringing sound, about every 3 seconds. For example, the processor 14 may output a *.wav file, which may be labelled RING.WAV, which is processed by the output device 20 to output an audible ringing sound.

The mail server 28 then polls the second processing unit 22, for example, every 3–5 seconds, to deliver the E-mail.

Generally, the second processing unit 22 checks the incoming lines, for example, at regular intervals to wait for and to detect incoming E-mail from the mail server 28 through the Internet 24.

Typically, for sending E-mail to users having associated processing units operatively connected to a host computer or server operating an Internet gateway, E-Mail for a specific user may be sent over the Internet 24 and directed to the permanent IP address or the SLIP/PPP account designation of the host computer, which then assigns a temporary IP address to the processing unit of the specified user for properly routing the E-mail. The E-mail signal may include a name or other designation such as a username which identifies the specific user regardless of the processing unit assigned to the user; that is, the host computer may track and store the specific device where a specific user is assigned or logged on, independent of the IP address system, and so the host computer may switch the E-mail signal to the device of the specific user. At that time, a temporary IP address may be generated or assigned to the specific user and device.

Upon detecting and/or receiving the incoming E-mail signal from the first processing unit 12, the second processing unit 22 may assign or may be assigned a temporary IP address. Therefore, the delivery of the E-mail through the Internet 24 provides the second processing unit 22 with a session number as well as IP addresses of both the first processing unit 12 and the second processing unit 22.

Point-to-point communication may then be established by the processing units 12, 22. For example, the second processing unit 22 may process the E-mail signal to extract the <ConnectRequest> message, including the IP address of the first processing unit 12 and the session number. The second processing unit 22 may then open a socket and generate a <ConnectOK> response signal, which includes the temporary IP address of the second processing unit 22 as well as the session number.

The second processing unit 22 sends the <ConnectOK> signal directly over the Internet 24 to the IP address of the first processing unit 12 without processing by the mail server 28, and a timeout timer of the second processing unit 22 may be set to wait and detect a <Call> signal expected from the first processing unit 12.

Realtime point-to-point communication of audio signals over the Internet 24, as well as video and voicemail, may thus be established and supported without requiring permanent IP addresses to be assigned to either of the users or processing units 12, 22. For the duration of the realtime point-to-point link, the relative permanence of the current IP addresses of the processing units 12, 22 is sufficient, whether the current IP addresses were permanent (i.e. predetermined or preassigned) or temporary (i.e. assigned upon initiation of the point-to-point communication).

In the exemplary embodiment, a first user operating the first processing unit 12 is not required to be notified by the first processing unit 12 that an E-mail is being generated and sent to establish the point-to-point link with the second user at the second processing unit 22. Similarly, the second user is not required to be notified by the second processing unit 22 that an E-mail has been received and/or a temporary IP address is associated with the second processing unit 22. The processing units 12, 22 may perform the disclosed point-to-point Internet protocol automatically upon initiation of the point-to-point communication command by the first user without displaying the E-mail interactions to either user. Accordingly, the disclosed point-to-point Internet protocol may be transparent to the users. Alternatively, either of the first and second users may receive, for example, a brief message of "CONNECTION IN PROGRESS" or the like on a display of the respective output device of the processing units 12, 22.

After the initiation of either the primary or the secondary point-to-point Internet protocols described above in conjunction with FIGS. 1–2, the point-to-point communication link over the Internet 24 may be established as shown in FIGS. 3–4 in a manner known in the art. For example, referring to FIG. 3, upon receiving the <ConnectOK> signal from the second processing unit 22, the first processing unit 12 extracts the IP address of the second processing unit 22 and the session number, and the session number sent from the second processing unit 22 is then checked with the session number originally sent from the first processing unit 12 in the <ConnectRequest> message as E-mail. If the session numbers sent and received by the processing unit 12 match, then the first processing unit 12 sends a <Call> signal directly over the Internet 24 to the second processing unit 22; i.e. using the IP address of the second processing unit 22 provided to the first processing unit 12 in the <ConnectOK> signal.

Upon receiving the <Call> signal, the second processing unit 22 may then begin a ring sequence, for example, by indicating or annunciating to the second user that an incoming call is being received. For example, the word "CALL" may be displayed on the output device of the second processing unit 22. The second user may then activate the second processing unit 22 to receive the incoming call.

Referring to FIG. 4, after the second processing unit 22 receives the incoming call, realtime audio and/or video conversations may be conducted in a manner known in the art between the first and second users through the Internet 24, for example, by compressed digital audio signals. Each of the processing units 12, 22 may also display to each respective user the words "IN USE" to indicate that the point-to-point communication link is established and audio or video signals are being transmitted.

In addition, either user may terminate the point-to-point communication link by, for example, activating a termination command, such as by activating an [END] button or icon on a respective processing unit, causing the respective processing unit to send an <End> signal which causes both processing units to terminate the respective sockets, as well as to perform other cleanup commands and functions known in the art.

FIGS. 5–6 illustrate examples of display screens 36 which may be output by a respective output device of each processing unit 12, 22 of FIGS. 1–4 for providing the disclosed point-to-point Internet protocol and system 10. Such display screens may be displayed on a display of a personal computer (PC) or a PDA in a manner known in the art.

As shown in FIG. 5, a first display screen 36 includes a status area 38 for indicating, for example, a called user by name and/or by IP address or telephone number; a current function such as C2; a current time; a current operating status such as "IN USE", and other control icons such as a down arrow icon 40 for scrolling down a list of parties on a current conference line. The operating status may include such annunciators as "IN USE", "IDLE", "BUSY", "NO ANSWER", "OFFLINE", "CALL", "DIALING", "MESSAGES", and "SPEEDDIAL".

Other areas of the display screen 36 may include activation areas or icons for actuating commands or entering data. For example, the display screen 36 may include a set of icons 42 arranged in columns and rows including digits 0–9 and commands such as END, SND, HLD, etc. For example, the END and SND commands may be initiated as described above, and the HLD icon 44 may be actuated to place a current line on hold. Such icons may also be configured to substantially simulate a telephone handset or a cellular telephone interface to facilitate ease of use, as well as to simulate function keys of a keyboard. For example, icons labelled L1–L4 may be mapped to function keys F1–F4 on standard PC keyboards, and icons C1–C3 may be mapped to perform as combinations of function keys, such as CTRL-F1, CTRL-F2, and CTRL-F3, respectively. In addition, the icons labelled L1–L4 and C1–C3 may include circular regions which may simulate light emitting diodes (LEDs) which indicate that the function or element represented by the respective icon is active or being performed.

Icons L1–L4 may represent each of 4 lines available to the caller, and icons C1–C3 may represent conference calls using at least one line to connect, for example, two or more parties in a conference call. The icons L1–L4 and C1–C3 may indicate the activity of each respective line or conference line. For example, as illustrated in FIG. 5, icons L1–L2 may have lightly shaded or colored circles, such as a green circle, indicating that each of lines 1 and 2 are in use, while icons L3–L4 may have darkly shaded or color circles, such as a red or black circle, indicating that each of lines 3 and 4 are not in use. Similarly, the lightly shaded circle of the icon labelled C2 indicates that the function corresponding to C2 is active, as additionally indicated in the status area 38, while darkly shaded circles of icons labelled C1 and C3 indicate that such corresponding functions are not active.

The icons 42 are used in conjunction with the status area 38. For example, using a mouse for input, a line that is in use as indicated by the lightly colored circle of the icon may be activated to indicate a party's name by clicking a right mouse button for 5 seconds until another mouse click is actuated or the [ESC] key or icon is actuated. Thus, the user may switch between multiple calls in progress on respective lines.

Using the icons as well as an input device such as a mouse, a user may enter the name or alias or IP address, if known, of a party to be called by either manually entering the name, by using the speeddial feature, or by double clicking on an entry in a directory stored in the memory, such as the memory 16 of the first processing unit 12, where the directory entries may be scrolled using the status area 38 and the down arrow icon 40.

Once a called party is listed in the status area 38 as being active on a line, the user may transfer the called party to another line or a conference line by clicking and dragging the status area 38, which is represented by a reduced icon 46. Dragging the reduced icon 46 to any one of line icons L1–L4 transfers the called party in use to the selected line, and dragging the reduced icon 46 to any one of conference line icons C1–C3 adds the called party to the selected conference call.

Other features may be supported, such as icons 48–52, where icon 48 corresponds to, for example, an ALT-X command to exit the communication facility of a processing unit, and icon 50 corresponds to, for example, an ALT-M command to minimize or maximize the display screen 36 by the output device of the processing unit. Icon 52 corresponds to an OPEN command, which may, for example, correspond to pressing the O key on a keyboard, to expand or contract the display screen 36 to represent the opening and closing of a cellular telephone. An "opened" configuration is shown in FIG. 5, and a "closed" configuration is shown in FIG. 6. In the "opened" configuration, additional features such as output volume (VOL) controls, input microphone (MIC) controls, waveform (WAV) sound controls, etc.

The use of display screens such as those shown in FIGS. 5–6 provided flexibility in implementing various features available to the user. It is to be understood that additional features such as those known in the art may be supported by the processing units 12, 22.

Alternatively, it is to be understood that one skilled in the art may implement the processing units 12, 22 to have the features of the display screens in FIGS. 5–6 in hardware; i.e. a wired telephone or wireless cellular telephone may include various keys, LEDs, liquid crystal displays (LCDs), and touchscreen actuators corresponding to the icons and features shown in FIGS. 5–6. In addition, a PC may have the keys of a keyboard and mouse mapped to the icons and features shown in FIGS. 5–6.

Figure 7:
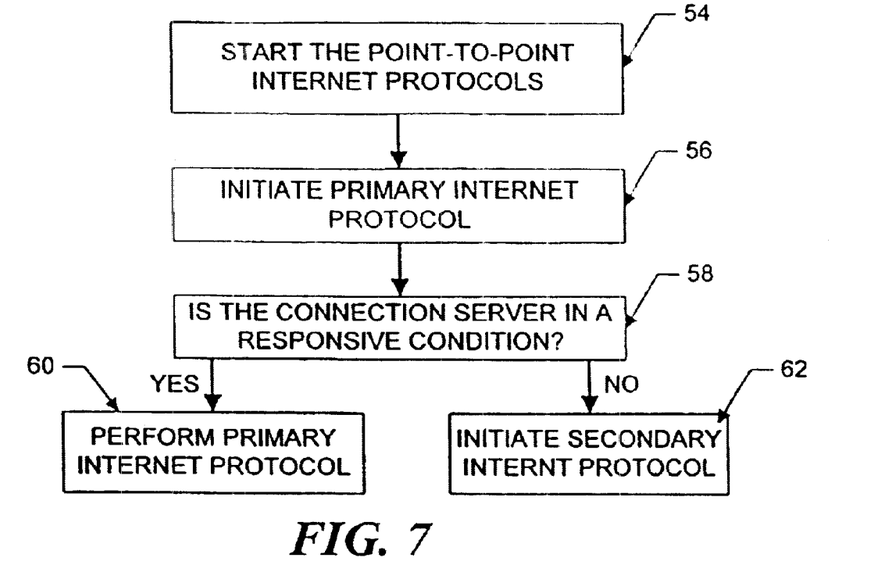
FIG. 7 illustrates a flowchart of the initiation of the point-to-point Internet protocols.

Referring to FIG. 7, the disclosed point-to-point Internet protocol and system 10 is initiated at a first processing unit 12 for point-to-point Internet communications by starting the point-to-point Internet protocols in step 54; initiating the primary point-to-point Internet protocol in step 56 by sending a query from the first processing unit 12 to the connection server 26; determining if the connection server 26 is operative to perform the point-to-point Internet protocol in step 58 by receiving, at the first processing unit 12, an on-line status signal from the connection server 26, which may include the IP address of the callee or a "Callee Off-Line" message; performing the primary point-to-point Internet protocol in step 60, which may include receiving, at the first processing unit 12, the IP address of the callee if the callee is active and on-line; and initiating and performing the secondary point-to-point Internet protocol in step 62 if the called party is not active and/or on-line.

Figure 8:
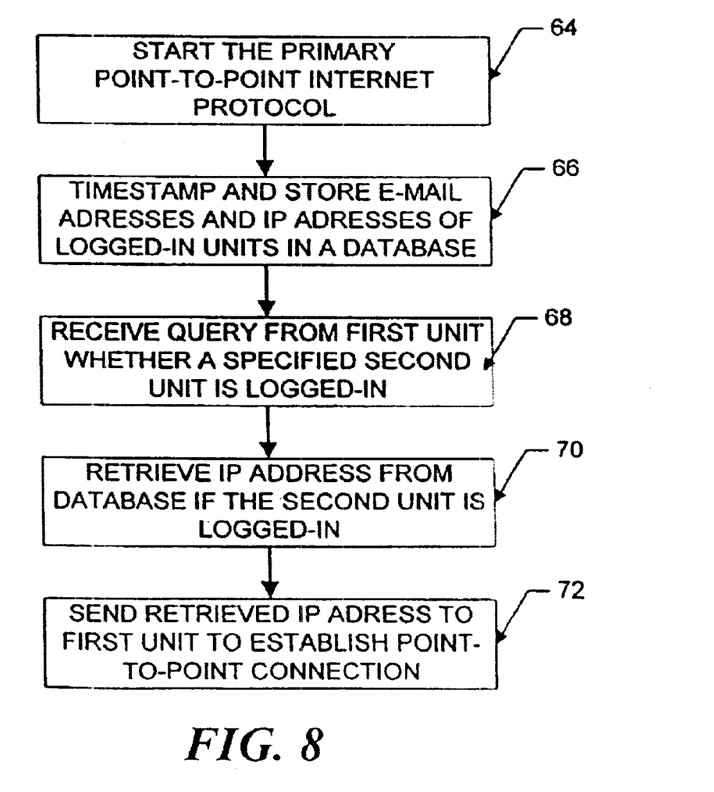
FIG. 8 illustrates a flowchart of the performance of the primary point-to-point Internet protocols.

Referring to FIG. 8 in conjunction with FIGS. 1 and 3–4, the disclosed point-to-point Internet protocol and system 10 operates using the connection server 26 to perform step 60 in FIG. 7 by starting the point-to-point Internet protocol in step 64; timestamping and storing E-mail and IP addresses of logged-in users and processing units in the database 34 in step 66; receiving a query at the connection server 26 from a first processing unit 12 in step 68 to determine whether a second user or second processing unit 22 is logged-in to the Internet 24, with the second user being specified, for example, by an E-mail address; retrieving the IP address of the specified user from the database 34 in step 70 if the specified user is logged-in to the Internet; and sending the retrieved IP address to the first processing unit in step 72 to establish point-to-point Internet communications with the specified user.

Figure 9:
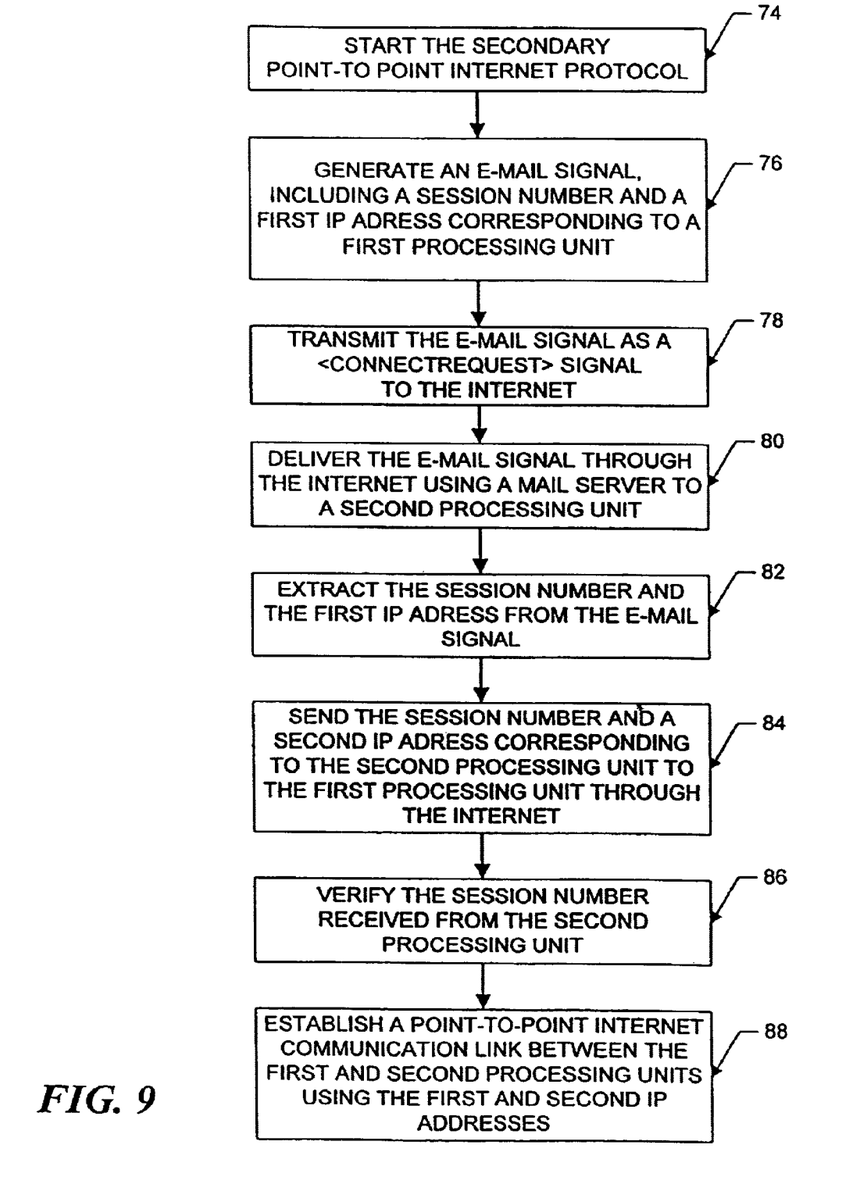
FIG. 9 illustrates a flowchart of the performance of the secondary point-to-point Internet protocol.

Referring to FIG. 9 in conjunction with FIGS. 2–4, the disclosed secondary point-to-point Internet protocol and system 10 operates at the first processing unit 12 to perform step 62 of FIG. 7. The disclosed secondary point-to-point Internet protocol operates as shown in FIG. 9 by starting the secondary point-to-point Internet protocol in step 74; generating an E-mail signal, including a session number and a first IP address corresponding to a first processing unit in step 76 using the first processing unit 12; transmitting the E-mail signal as a <ConnectRequest> signal to the Internet 24 in step 78; delivering the E-mail signal through the Internet 24 using a mail server 28 to a second processing unit 22 in step 80; extracting the session number and the first IP address from the E-mail signal in step 82; transmitting or sending the session number and a second IP address corresponding to the second processing unit 22 to the first processing unit 12 through the Internet 24 in step 84; verifying the session number received from the second processing unit 22 in step 86; and establishing a point-to-point Internet communication link between the first processing unit 12 and second processing unit 22 using the first and second IP addresses in step 88.

While the disclosed point-to-point Internet protocols and system have been particularly shown and described with reference to the preferred embodiments, it is understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. A method for establishing point-to-point Internet communication comprising the steps of:

(a) transmitting an E-mail message, automatically including a first Internet Protocol (IP) address assigned to a first processing unit;

(b) processing the E-mail message through the Internet to deliver the E-mail message to a second processing unit; and (c) automatically transmitting a second IP address to the first processing unit using the first Internet Protocol address assigned to the first processing unit for establishing a point-to-point communication link between the first and second processing units through the Internet.

2. The method of claim 1 further comprising the step of:

(a1) generating the E-mail message including the first IP address corresponding to the first processing unit before the step of transmitting the E-mail message.

3. The method of claim 1 further comprising the step of:

(a1) generating the E-mail message from a session number before the step of transmitting the E-mail message.

4. The method of claim 1 wherein the step (b) of processing the E-mail message further comprises the step of:

(b1) processing the E-mail message using a mail server operatively connected to the second processing unit.

5. The method of claim 1 further comprising the step of:

(b1) generating a connection signal including the second IP address at the second processing unit before the step (c) of transmitting the second IP address to the first processing unit; and wherein the step (c) of transmitting the second IP address includes the step (c1) of transmitting the connection signal from the second processing unit to the first processing unit.

6. A system for point-to-point communications over the Internet comprising:

a first processing unit including:
      a first program for performing a point-to-point Internet protocol; and
      a first processor for executing the first program and for automatically transmitting an E-mail message, including
   a first Internet Protocol (IP) address corresponding to the first processing unit; and
   a mail server for processing the E-mail message through the Internet to deliver the E-mail message to a second processing unit for establishing a point-to-point communication link between the first and second processing units through the Internet;

wherein the second processing unit transmits a message including a second Internet protocol address corresponding to the second processing unit using the first Internet protocol address assigned to the first processing unit.

7. The system of claim 6 wherein the second processing unit includes;

a second program for performing the point-to-point Internet Protocol;

a second processor for executing the second program and for receiving the E-mail message from the mail server and for generating a connection signal, including a second IP address, for establishing the point-to-point communication link to the first processing unit.

8. A computer program product for use with a computer system, the computer system executing a first process operatively connectable to a second process and a server over a computer network, the computer program product comprising:

a computer useable medium having program code embodied in the medium, the program code further comprising:
      program code for transmitting an E-mail message comprising an Internet protocol address of the first process to the server over the computer network;
      program code for receiving an Internet protocol address of the second process, transmitted from the second process using the Internet protocol address of the first process, over the computer network; and
      program code, responsive to the Internet protocol address of the second process, for establishing a point-to-point communication between the first process and the second process.

9. In a first computer process operatively coupled over a computer network to a second process and an E-mail server, a method of establishing a point-to-point communication between the first and second processes comprising the steps of:

A. transmitting an E-mail message automatically incorporating a first Internet protocol address of the first process to the second process over the computer network;

B. receiving a second Internet protocol address from the second process over the computer network, the second process sending the second Internet protocol address to the first process using the first Internet protocol address; and C. in response to reception of the second network protocol address, establishing a point-to-point communication connection between the first process and the second process.

* * * * *